Figure 1:
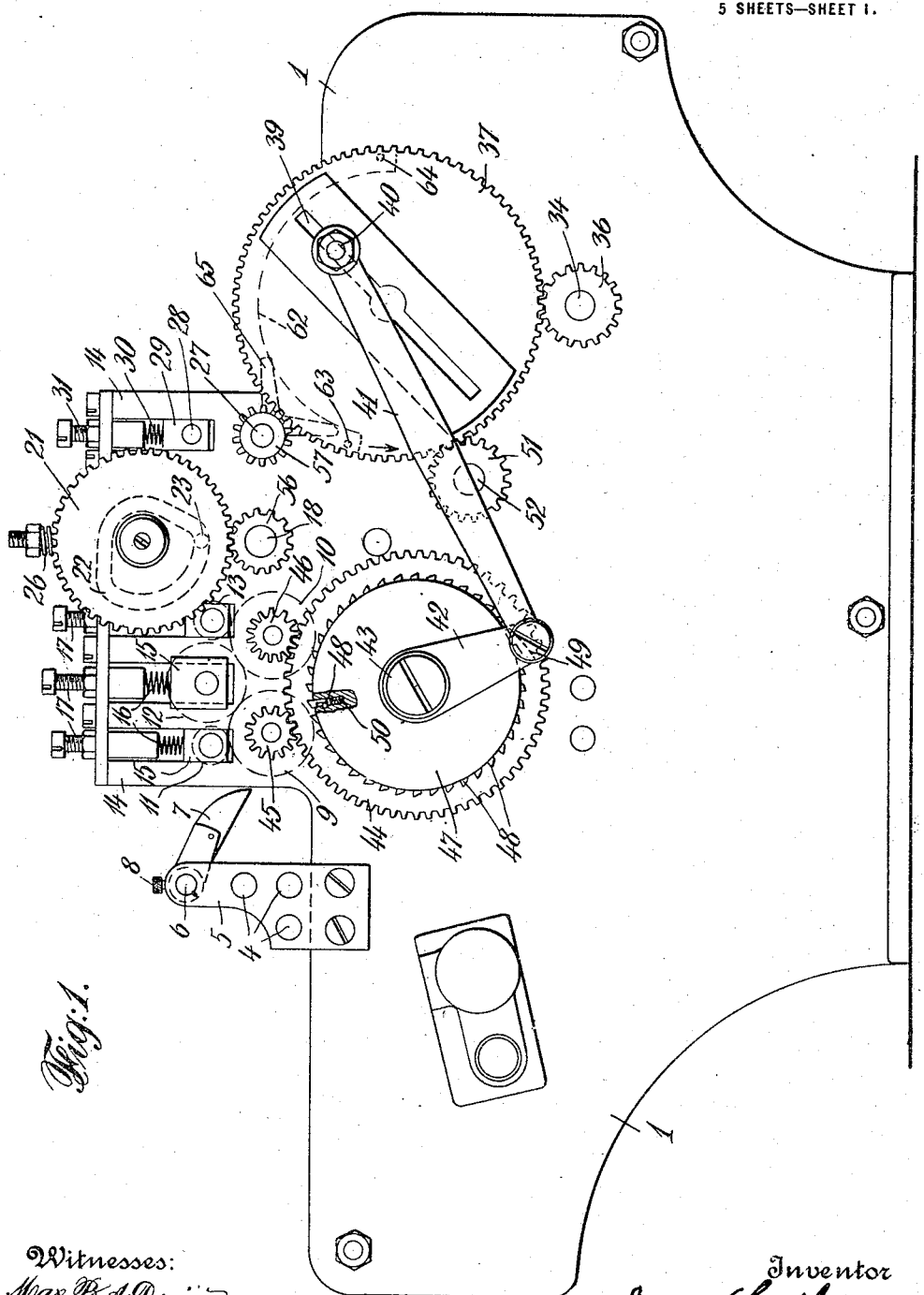

J. LEATHEM.
CLOTH CUTTING MACHINE.
APPLICATION FILED JAN. 18, 1915.

1,211,185.

Patented Jan. 2, 1917.
5 SHEETS—SHEET 1.

Witnesses:
Max B. A. Döring
Paul H. Franke

Inventor
James Leathem
By his Attorneys
Raegner & Matty

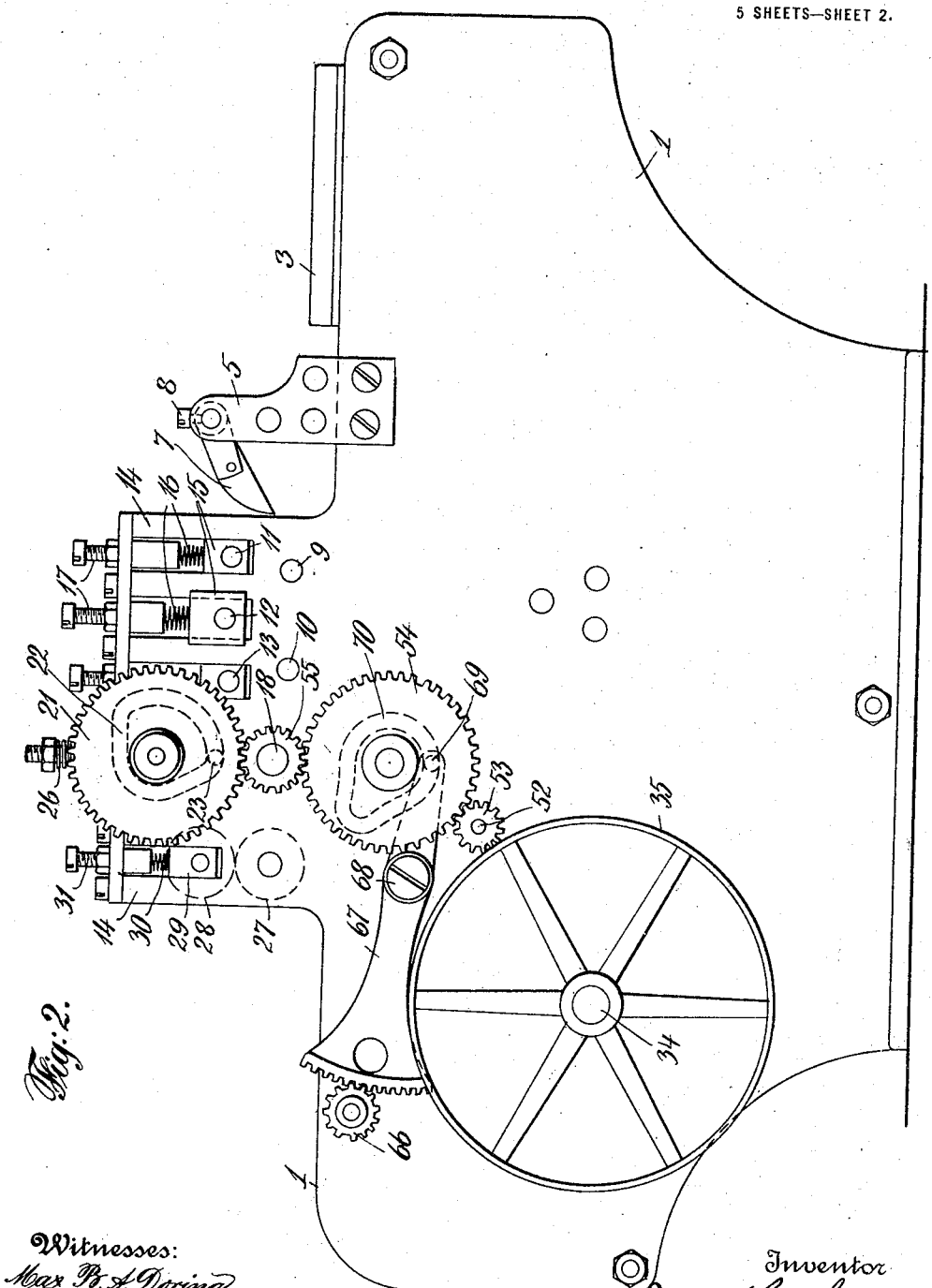

J. LEATHEM.
CLOTH CUTTING MACHINE.
APPLICATION FILED JAN. 18, 1915.
1,211,185.
Patented Jan. 2, 1917.
5 SHEETS—SHEET 3.
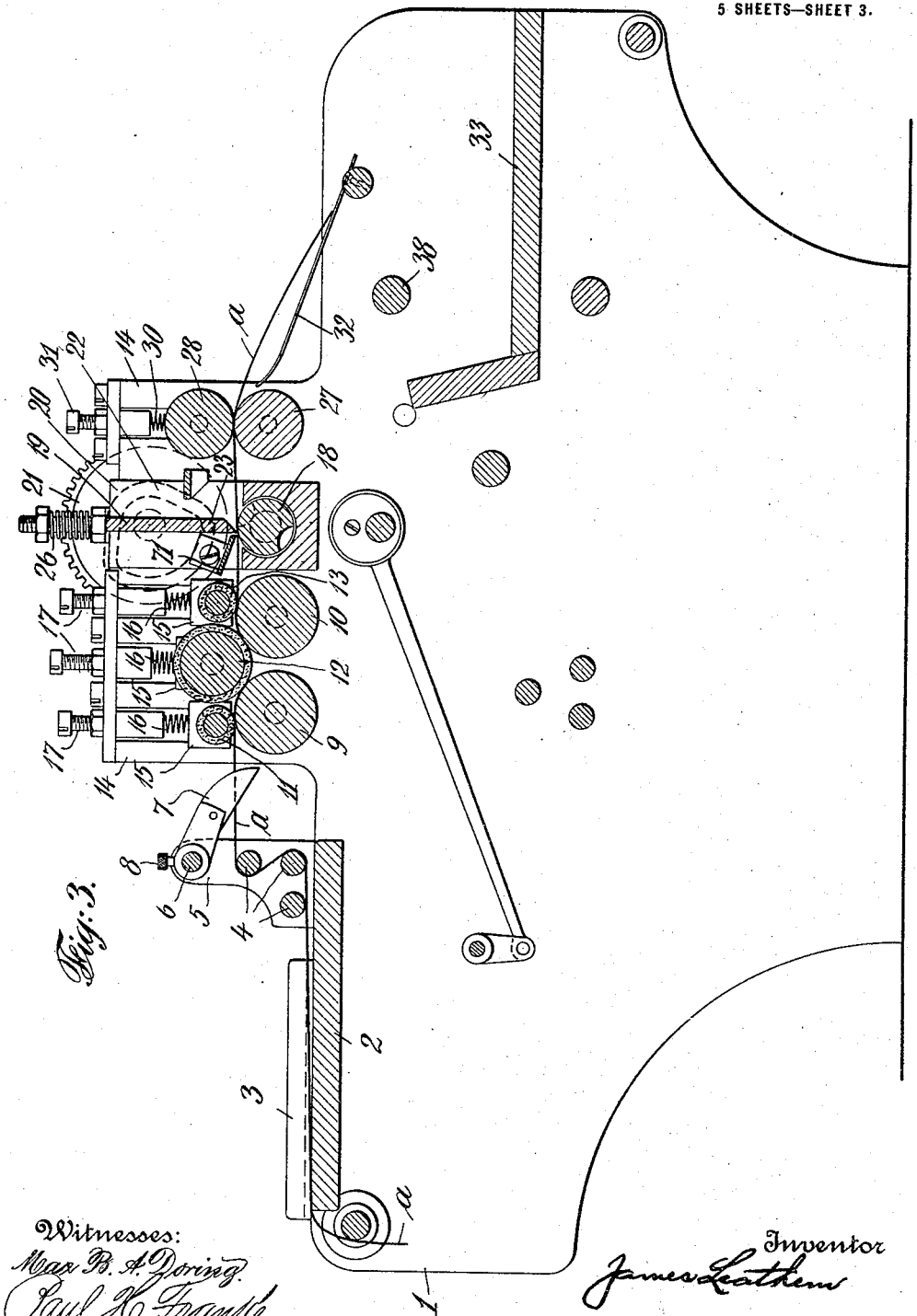

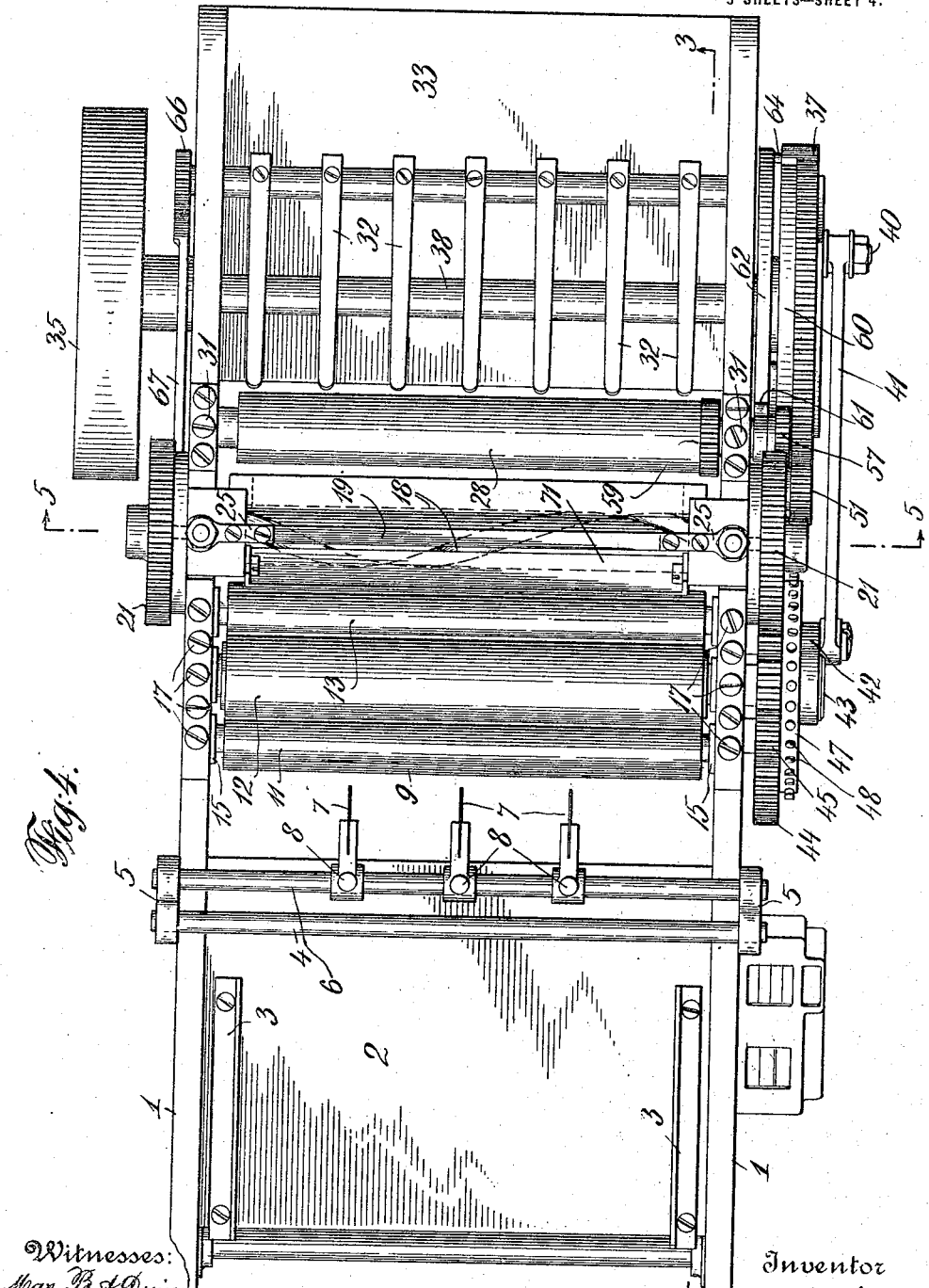

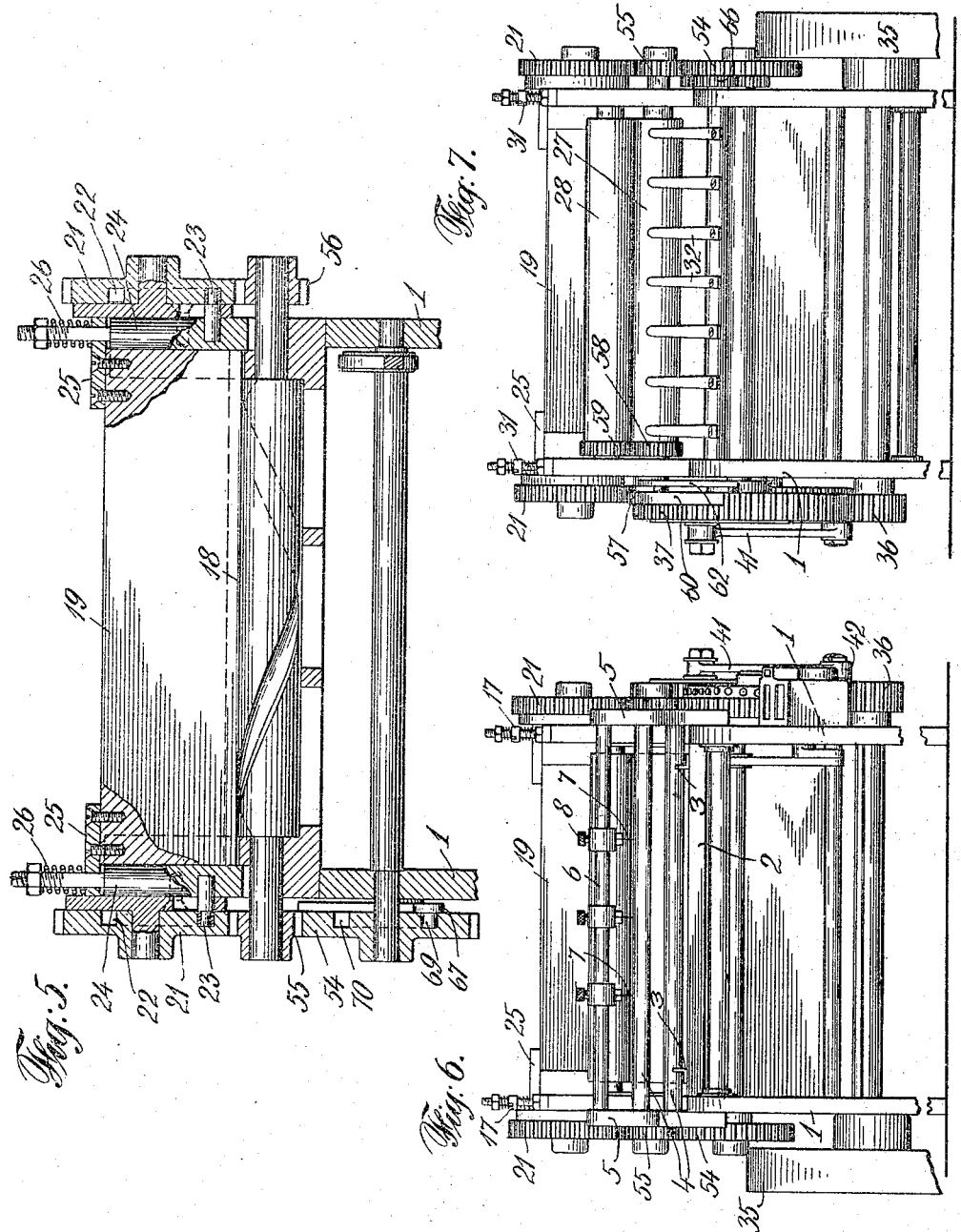

UNITED STATES PATENT OFFICE.

JAMES LEATHEM, OF LEBANON, PENNSYLVANIA, ASSIGNOR TO HERRMANN AUKAM & CO., OF NEW YORK, N. Y., A CORPORATION OF NEW YORK.

CLOTH-CUTTING MACHINE.

1,211,185.      Specification of Letters Patent.      Patented Jan. 2, 1917.

Application filed January 18, 1915. Serial No. 2,780.

*To all whom it may concern:*

Be it known that I, JAMES LEATHEM, a citizen of the United States, and a resident of Lebanon, county of Lebanon, and State of Pennsylvania, have invented a certain new and useful Cloth-Cutting Machine, of which the following is a specification.

This invention relates to a machine for cutting cloth or like material, both longitudinally and transversely, and the objects of the invention are to construct a machine that is adapted to cut material used for handkerchiefs and the like into suitable sizes to be subsequently hemmed for use as handkerchiefs or the like.

To the accomplishment of the above objects and to such others as may hereinafter appear, the invention comprises a cloth cutting machine, having means for cutting the cloth longitudinally into strips, and means for cutting said strips transversely, feed rollers for feeding the cloth from the longitudinal cutting means through the transverse cutting means, and means for regulating the movements of said feed rollers.

The invention also comprises means for stretching the material before cutting the same transversely, and also means for stacking the cut material as it leaves the machine.

I will now proceed to describe my invention with reference to the accompanying drawings, and will then point out the novel features in claims:

In the drawings: Figure 1 is a side elevation of one side of a machine made in accordance with the present invention. Fig. 2 is a side elevation of the other side of the machine shown in Fig. 1. Fig. 3 is a longitudinal view in cross-section on the line 3—3 of Fig. 4. Fig. 4 is a top view of the machine. Fig. 5 is a transverse view in cross-section on the line 5—5 of Fig. 4. Figs. 6 and 7 are end views of the machine.

In the drawings, the numeral 1 designates the side castings of the frame of the machine upon which the different parts of the machine are supported as hereinafter described.

At one end of the machine is suitably secured, in the present instance, a guide table 2, provided with suitable side guides 3, over which the material $a$ to be cut passes. After the material $a$ leaves the guide table 2 it passes, in the present instance, about suitable transverse guide rods 4, the ends of which are secured to the uprights 5 mounted on opposite sides of the machine. The uprights 5 also support, in the present instance, a transverse rod 6 upon which are adjustably mounted one or more knives or cutters 7 which can be adjusted into or out of position by means of set screws 8. By referring to Fig. 4 it will be seen that the cutters 7 are, in the present instance, three in number and so spaced along the rod 6 that the material $a$ as it passes will be cut at three different places to produce four strips of cloth of equal width. If desired the cutters can be spaced at different distances along the rod 6 to cut the material $a$ into strips of varying widths, or the cutters can be moved out of the way, or more cutters added as may be desirable.

After the material, $a$, passes the cutters the same passes, in the present instance, between a suitable set of transverse feed rollers, 9, 10, 11, 12 and 13, the ends of which are rotatably mounted in suitable uprights 14 mounted on opposite sides of the frame of the machine. The feed rollers 9 and 10 are in the present instance mounted in stationary bearings whereas the rollers 11, 12 and 13 are mounted in suitable sliding bearings 15 held in position by means of suitable adjustable springs 16 controlled by set screws 17. The bottom feed rollers 9 and 10 are each arranged to be engaged by the top roller 12, top roller 11 engaging the roller 9, whereas the top roller 13 engages the roller 10 as clearly shown in Fig. 3.

The bottom rollers 9 and 10 are in the present instance preferably made of metal and knurled on their outer or bearing surfaces, whereas the outer or bearing surfaces of the top rollers 11, 12 and 13 are preferably covered with rubber or the like so as to tightly engage the material $a$ to draw the same past the cutters 7 as the bottom rollers 9 and 10 are rotated intermittently, as later described.

The material $a$ as it leaves the feed rollers passes through a suitable cutting or shearing device which cuts the material $a$ transversely. In the present instance, the transverse cutting device comprises a rotary cutter 18, the ends of which are journaled in the sides of the frame, the rotary cutter operating in conjunction with a reciprocating blade 19, the ends of which are slidably mounted in vertical guides 20 secured to the uprights 14 of the frame of the machine. The blade 19 is reciprocated into and out of engaging position with the rotary cutter 18 by means of two cam gears 21 rotatably mounted on the uprights 14 opposite each end of the blade 19, as shown in Fig. 5. The cam gears 21 are both alike, each being provided with a cam groove 22 which engages one end of a follower pin 23, the other end of which is secured to a sliding bar 24, the upper end of which passes through a hole in the plate 25 secured to the top of the blade 19, the sliding bar 24 being held in flexible engagement with the blade 19 by means of the spring 26. The cam grooves 22 are each cut as shown in the drawings so that when the gears 21 are rotated the blade 19 will be held in contact with the rotary cutters 18 until the material $a$ is cut transversely, after which the cam grooves 22 operate to raise the blade 19 to permit of an additional length of material $a$ to pass over the rotary cutter 18, and until the cam grooves 22 again operate to bring the blade 19 in contact with the rotary cutter 18 to again cut the material $a$ in a transverse direction.

After the material $a$ passes through the transverse cutter it passes, in the present instance, through two guide rollers 27 and 28, in the present instance made of metal and having smooth bearing surfaces. The roller 27 is mounted in stationary bearings in the frame of the machine, whereas the roller 28 is mounted in suitable sliding bearings 29 held in position by means of suitable adjustable springs 30 controlled by set screws 31.

As the material $a$ leaves the guide rollers 27 and 28 it passes in the present instance upon the blades of a suitable stacking device 32, the ends of which are rotatably mounted in the frame of the machine. The stacking device 32 is operated, as hereinafter described, so as to take the longitudinally and transversely cut pieces of material $a$ as the same come from the guide rollers 27 and 28 and by rotating on its bearings deposits the cut pieces of material $a$ upon the table 33 of the machine.

The different parts of the machine are operated through the medium of a driving shaft 34 to one end of which is secured a driving pulley 35. The other end of the driving shaft 34 is provided with a small gear 36 which meshes with a large controlling gear 37, mounted on one end of a shaft 38.

The controlling gear 37 is provided on its outer face with a radial adjusting slot 39 in which is adjustably secured a bolt 40 to which is pivoted one end of an adjustable link 41. The other end of the adjustable link 41 is pivoted to one end of a link 42, the other end of which is pivoted on a pin 43 secured to the frame of the machine. Loosely mounted on the pin 43 is a gear 44 which engages two small gears 45 and 46 secured to the ends of the bottom feed rollers 9 and 10. Secured to the gear 44 and movable with it is a ratchet wheel 47 provided on its periphery with a series of spring pressed pins 48 having inclined faces. The inner side of the free end of the link 42 is provided with an inclined projection 49, shown in dotted lines in Fig. 1, which is arranged to engage one of the pins 48, to rotate the gear 44 in a counter-clock wise direction, when the link 42 is moved from left to right by the movement of the link 41, actuated by the rotation of the controlling gear 37. When during the rotation of the controlling gear 37 the link 41 moves the link 42 to the left, the inclined projection 49 moves over the pins 48 by forcing the same inward against the action of the small springs 50, the gear 44 together with the gears 45 and 46 connected to the bottom rollers 9 and 10 remaining stationary.

From the above description it will be seen that during a part of every complete rotation of the controlling gear 37 the controlling link 41 operates to turn the feed rollers 9 and 10 and thereby the rollers 11, 12 and 13 a certain number of turns to draw a certain predetermined length of the material $a$ past the knives 7. It will also be seen that during a part of every complete rotation of the controlling gear 37 the controlling link 41 operates so as not to turn the feed rollers 9 and 10.

The amount of material $a$ drawn past the knives 7, or the number of turns made by the feed rollers, in any one revolution of the controlling gear 37, is regulated by the position in the slot 39 of the bolt 40 to which the end of the controlling lever 41 is pivoted, it being obvious that the farther away from the center of the controlling gear 37 the bolt 40 is set the greater will be the throw of the free end of the lever 42 which operates to turn the feed rollers a greater number of turns.

The controlling gear 37 is arranged to engage a small gear 51 secured to one end of a shaft 52 which passes through to the other side of the machine and has secured to its other end a small gear 53 which meshes with a gear 54 which in turn meshes with a gear 55 secured to one end of the rotary cutter 18, the other end of the rotary cutter being provided with a gear 56 which is similar to the gear 55. Both gears 55 and 56 are arranged to engage the cam gears 21 which operate the reciprocating blade 19.

From the above description it will be seen that the rotary cutter 18 is continually rotated through the medium of the controlling gear 37, and the reciprocating blade 19 continually operated through the medium of the cam gears 21, which are driven by the gears 55 and 56 secured to the rotary cutter 18. The cam gears 21 are set in relation to the movement of the feed rollers so as to bring the reciprocating blade 19 in contact with the rotary cutter, to cut the material $a$ transversely, only after the feed rollers have stopped and after having fed a certain predetermined length of material $a$.

The controlling gear 37 is arranged to engage a small gear 57 mounted on one end of the roller 27 which is also provided with a small gear 58, see Fig. 7, which meshes with a similar gear 59 secured to the roller 28. During the time the reciprocating blade 19 and the rotary cutter 18 are operating to cut the material $a$ transversely, it is necessary to stop the rotation of the guide rollers 27 and 28. By referring to Fig. 4 it will be seen that the gear 57 is less than the width of the controlling gear 37 and that a portion of the teeth in the path of the gear 57 have been removed to provide a groove 60. When in the rotation of the controlling gear 37 the gear 57 comes to the groove 60, the gear 57, which drives the guide rollers 27 and 28 stops rotating until the groove 60 is passed and the teeth on the controlling gear 37 again engage the gear 57. To insure the teeth of the gear 57 meshing with the teeth of the controlling gear 37 after the groove 60 has rotated past the same, a small guide plate 61, see Fig. 4, is secured to the back of the gear 57 and is arranged to slide upon a guide plate 62 which extends the full length of the groove 60 and is secured to the back of the controlling gear 37 by means of two pins 63 and 64. In the present instance the back of the gear 57 is also provided with a forked pawl 65, the arms of which are adapted to engage the pins 63 and 64 as the controlling gear 37 rotates to insure the gear 37 meshing with the controlling gear 37 at the end of the groove 60.

The groove 60 on the controlling gear 37 is arranged so that the guide rollers 27 and 28 will remain stationary during the time the reciprocating blade 19 is in contact with the rotary cutter 18 to cut the material $a$ transversely. The groove 60 is also arranged on the controlling gear 37 so as to permit of the guide rollers 27 and 28 rotating a short distance after the feed rollers 9 and 10 have stopped to insure the stretching of the material just previous to the time the reciprocating blade 19 is brought in contact with the rotary cutter 18. It is important that both the feed rollers and the guide rollers be stationary during the time the material $a$ is being cut transversely, the different operating parts above described being set accordingly. When the gear 57 is no longer rotated by the gear 37, that is when the gear 57 engages the cut-away portion 60 of the gear 37, the gear 57 ought, as a matter of fact, be in a position to again engage the gear 37 when the cut-away portion 60 has come to an end. In practice, however, it has been found that the gear 57 is not always in a position to properly engage the gear 37, so as to prevent the jamming of the top of one of the teeth of the gear 57 with the top of the first tooth on the gear 37 after the termination of the cut-away portion 60. It is for this reason that the guide plate 61 is provided which is arranged to slide upon a guide plate 62 so as to make certain that the gear 57 will engage the gear 37. A forked pawl 65 is also provided as described in the specification to make the gear 57 positively engage the gear 37 in a correct manner after the cut-away portion 60 has been passed.

The shaft of the stacking device 32 is provided with a gear 66, see Fig. 2, which meshes with the geared end of a lever 67, pivoted near its center to a pin 68. The other end of the lever 67 is provided with a follower 69 which engages a suitable cam groove 70 in the side of the gear 54. The cam groove 70 is cut so as to oscillate the lever 67 to move the stacking device 32 so as to remove the cut pieces of material $a$ as they leave the guide rollers and deposit them on the table 33 and return for other cut pieces as they leave the guide rollers. A suitable stationary guide 71, see Figs. 3 and 4, is provided adjacent the top of the rotary cutter 18 to guide the end of the material $a$ after it has been cut transversely.

The operation of the machine is as follows: Material $a$ to be cut is placed upon the table 2 and fed between the feed rollers 9, 10, 11, 12 and 13. The knives 7 are then placed in position to cut the material $a$ in as many longitudinal strips as may be desired. The end of the lever 41 is then adjusted in the slot 39 so as to control the feeding movement of the feed rollers. As it is usually desired to cut the longitudinal strips of material $a$ into squares, the lever 41 is adjusted so that the material is fed forward on every revolution of the controlling gear 37, a distance equal to the distance between the knives 7. The reciprocating blade 19 is then arranged to cut the material transversely upon every revolution of the controlling gear 37 shortly after the feed rollers have stopped, after having fed the material forward the desired distance, the guide rollers 27 and 28 being set so as to rotate for a short time after the feed rollers have stopped, and before the reciprocating blade operates, so as to stretch the material before it is cut by the action of the reciprocating blade. After the material $a$ is cut transversely, the guide rollers are set to again operate to feed the cut material upon the stacking device 32 which operates to stack the cut pieces upon the table 33, the feed rollers in the meantime operating to feed a new length of the material *a* under the reciprocating blade which has been raised to permit of the material passing.

While the invention has been described with particular reference to the details of construction, the same is not to be considered as limited thereto, as many changes can be made and still fall within the scope of the invention set forth in the following claims.

I claim—

1. A machine for cutting cloth and like material comprising in combination feed rollers for feeding the material, guide rollers for engaging the material after it leaves the feed rollers, transverse cutting means arranged between said feed rollers and said guide rollers, means for intermittently rotating said feed rollers and said guide rollers a predetermined distance, said guide rollers arranged to rotate a short distance after the feed rollers have stopped to stretch the material, and means for actuating said transverse cutting means to cut the material after said feed rollers and guide rollers have stopped rotating.

2. A machine for cutting cloth and like material comprising in combination longitudinal cutting means for cutting the material longitudinally, feed rollers for drawing the material through said longitudinal cutting means, guide rollers for engaging the material after it leaves the feed rollers, transverse cutting means arranged between said feed rollers and said guide rollers, means for intermittently rotating said feed rollers and said guide rollers a predetermined distance, said guide rollers arranged to rotate a short distance after the feed rollers have stopped to stretch the material, and means for actuating said transverse cutting means to cut the material after said feed rollers and guide rollers have stopped rotating.

3. A machine for cutting cloth and like material comprising in combination longitudinal cutting means for cutting the material longitudinally, feed rollers for drawing the material through said longitudinal cutting means, guide rollers for engaging the material after it leaves the feed rollers, transverse cutting means arranged between said feed rollers and said guide rollers, means for intermittently rotating said feed rollers and said guide rollers a predetermined distance, said guide rollers arranged to rotate a short distance after the feed rollers have stopped to stretch the material, and means for actuating said transverse cutting means to cut the material after said feed rollers and guide rollers have stopped rotating, and a stacking device for stacking the cut material after it leaves the guide rollers.

4. A machine for cutting cloth and like material, comprising in combination feed rollers for feeding the material, guide rollers for engaging the material after it leaves the feed rollers, transverse cutting means arranged between said feed rollers and guide rollers, means for intermittently rotating said feed rollers and said guide rollers a predetermined distance, comprising a controlling gear provided with intermittent means for rotating said guide rollers, a gear having a ratchet wheel for rotating said feed rollers, and a lever for operatively connecting said controlling gear and said ratchet wheel.

5. A machine for cutting cloth and like material, comprising in combination feed rollers for feeding the material, guide rollers for engaging the material after it leaves the feed rollers, transverse cutting means arranged between said feed rollers and guide rollers, means for intermittently rotating said feed rollers and said guide rollers a predetermined distance, comprising a controlling gear provided with intermittent means for rotating said guide rollers, a gear having a ratchet wheel for rotating said feed rollers, and a lever for operatively connecting said controlling gear and said ratchet wheel, and means for adjustably securing said lever to said controlling gear to permit of the same being adjusted to vary the amount of material fed by the feed rollers on each rotation of the controlling gear.

In testimony whereof I have signed this specification in the presence of two subscribing witnesses.

JAMES LEATHEM.

Witnesses:
J. W. Ross,
M. R. Ross.

Copies of this patent may be obtained for five cents each, by addressing the "Commissioner of Patents, Washington, D. C."